(12) United States Patent
Fujii

(10) Patent No.: US 8,588,316 B2
(45) Date of Patent: Nov. 19, 2013

(54) QR DECOMPOSITION DETECTION DEVICE AND METHOD SUPPORTING INTERFERENCE WHITENING

(75) Inventor: Masaaki Fujii, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1007 days.

(21) Appl. No.: 12/639,046

(22) Filed: Dec. 16, 2009

(65) Prior Publication Data

US 2010/0158162 A1 Jun. 24, 2010

(30) Foreign Application Priority Data

Dec. 24, 2008 (JP) ................................. 2008-328324
Apr. 15, 2009 (KR) ........................ 10-2009-0032600

(51) Int. Cl.
*H04K 1/10* (2006.01)
(52) U.S. Cl.
USPC .......................................................... 375/260
(58) Field of Classification Search
USPC ................................................. 375/260, 267
See application file for complete search history.

(56) References Cited

U.S. PATENT DOCUMENTS 8,036,295 B2 * 10/2011 Yoshida ........................ 375/267
2009/0245330 A1 * 10/2009 Khayrallah et al. ........... 375/148

OTHER PUBLICATIONS

K. Higuchi, H. Kawai, et al., "Adaptive Selection of Surviving Symbol Replica Candidates Based on Maximum Reliability in QRM-MLD for OFCDM MIMO Multiplexing," Dec. 2004, Proc. IEEE GLOBECOM'04, pp. 2480-2486, Dallas.
Y. Li, J. Winters, et al. "Signal Detection for MIMO-OFDM Wireless Communications," Proc. IEEE ICC'01, Jun. 2001, pp. 3077-3081.
Fujii, Masaaki, "Antenna-Permutation Channel-Vector Quantization for Finite Rate Feedback in Zero-Forcing Beamforming Multiuser MINO-OFDM Systems," IEICE Trans. Communication., vol. E92-B, No. NN MM 2009, pp. 1-10.
Fujii, Masaaki, "Zero-Forcing Beamforming Multiuser-MIMO Systems with Finite Rate Feedback for Multiple Stream Transmission Per User," IEICE Trans. Communication., vol. E91-B, No. NN MM 2008, pp. 1-4.
Fujii, Masaaki, "Pre-Whitening QR-Decomposition Maximum Likelihood Detection for Co-Channel Interference Rejection in MIMO Systems," IEICE Trans. Communication., vol. E92-B, No. NN MM 2009, pp. 1-4.
G.E. Bottomley and K. Jamal, "Adaptive arrays and MLSE," Proc. IEEE VTC'95, pp. 50-54, Chicago, May 1995.

* cited by examiner

*Primary Examiner* — Kevin Kim
(74) *Attorney, Agent, or Firm* — NSIP Law

(57) ABSTRACT

Disclosed is a QR decomposition device supporting interference whitening. The QR decomposition device supporting interference whitening may calculate a whitening matrix based on an interference channel matrix. The QR decomposition device supporting the interference whitening may simultaneously support interference whitening and detection of a transmission symbol vector through QR decomposition. A vector manufactured during the whitening and a result of the QR decomposition may be used for detecting the transmission symbol vector.

15 Claims, 5 Drawing Sheets

QR DECOMPOSITION DETECTION DEVICE AND METHOD SUPPORTING INTERFERENCE WHITENING

CROSS-REFERENCE TO RELATED APPLICATIONS

This application claims the benefit under 35 U.S.C. §119(a) of a Japanese Patent Application No. 2008-328324 filed on Dec. 24, 2008 in the Japanese Patent Office and a Korean Patent Application No. 10-2009-0032600 filed on Apr. 15, 2009 in the Korean Intellectual Property Office, the entire disclosures of which are incorporated herein by reference for all purposes.

BACKGROUND

1. Field

The following description relates to a technology to detect a transmission symbol vector in a multi-input multi-output (MIMO) communication system.

2. Description of Related Art

Researches have been conducted to provide various multimedia services, including a voice service, and to support a high quality and a high data transmission rate in a wireless communication environment. As part of the research, a technology related to a multi-input multi-out (MIMO) system using a plurality of channels in a spatial area has been developed.

The MIMO technology uses multiple antennas to increase a number of channel bits in a limited frequency resource, thereby providing a higher data transmission rate within the limited frequency resource. The MIMO technology uses multiple transmission/reception antennas in an environment where scatterers exist, thereby theoretically providing a channel capacity proportional to a smaller number of antennas between the transmission antennas and the reception antennas.

Developing the performance of a receiving unit used in the MIMO communication system is an important issue. Particularly, where a number of transmitting units is greater than or equal to two, a co-channel interference may occur in the receiving unit.

SUMMARY

According to one general aspect, there is provided a QR decomposition detection device supporting interference whitening, the device including a whitening unit to perform whitening of an interference existing in a reception symbol vector using a whitening matrix calculated based on an interference channel matrix, and to generate a manufactured vector, a QR decomposition unit to perform QR decomposition based on the whitening matrix and a target channel matrix, and a detector to detect a transmission symbol vector corresponding to the reception symbol vector based on the manufactured vector and a result of the QR decomposition.

The device may further include an interference channel matrix estimating unit to estimate the interference channel matrix, a correlation matrix calculator to calculate a correlation matrix of an intentional vector related to an error existing in the reception symbol vector, based on the interference channel matrix, and a whitening matrix calculator to calculate the whitening matrix based on the correlation matrix.

The whitening matrix calculator may perform a Cholesky decomposition of an inverse matrix of the correlation matrix, to calculate the whitening matrix.

The whitening matrix calculator may determine an upper-triangular matrix as the whitening matrix, wherein the upper-triangular matrix is obtained by performing a Cholesky decomposition with respect to an inverse matrix of the correlation matrix.

The device may further include an inverse matrix calculator to calculate an inverse matrix of the correlation matrix, wherein the whitening matrix calculator calculates the whitening matrix based on an inverse of the correlation matrix.

A multiplication of the whitening matrix and the target channel matrix may include a plurality of columns, and the QR decomposition unit may perform ordering of the plurality of columns according to a size of the plurality of columns and perform the QR decomposition with respect to the multiplication of the whitening matrix and the target channel matrix.

The whitening unit may multiply the reception symbol vector by the whitening matrix to generate the manufactured vector.

The QR decomposition unit may perform the QR decomposition with respect to a multiplication of the whitening matrix and the target channel matrix, and generate a Q matrix and an R matrix.

The detector may include a channel matrix upper-triangulating unit to upper-triangulate the target channel matrix using the manufactured vector and a Q matrix generated by the QR decomposition, and an estimating unit to estimate the transmission symbol vector based on an output of the channel matrix upper-triangulating unit.

The estimating unit may support interference whitening and estimate the transmission symbol vector according to a Trellis-search algorithm.

The channel matrix upper-triangulating unit may multiply the manufactured vector by a Hermitian matrix of the Q matrix.

According to another aspect, there is provided a QR decomposition method supporting interference whitening in a receiver, the method including estimating an interference channel matrix, calculating, based on the estimated interference channel matrix, a correlation matrix of an intentional vector related to an error existing in a reception symbol vector, whitening an interference existing in the reception symbol vector using the whitening matrix, and generating a manufactured vector, performing QR decomposition based on the whitening matrix and a target channel matrix, and detecting a transmission symbol vector corresponding to the reception symbol vector based on the manufactured vector and a result of the QR decomposition.

The calculating of the whitening matrix may include performing a Cholesky decomposition with respect to an inverse matrix of the correlation matrix, to calculate the whitening matrix.

The detecting of the transmission symbol vector may include upper-triangulating the target channel matrix using the manufactured vector and a Q matrix generated by the QR decomposition, and estimating the transmission symbol vector using a result obtained from the upper-triangulating of the channel matrix.

According to still another aspect, there is provided a computer readable recording media storing a program for implementing a method including estimating an interference channel matrix, calculating, based on the estimated interference channel matrix, a correlation matrix of an intentional vector related to an error existing in a reception symbol vector, whitening an interference existing in the reception symbol vector using the whitening matrix, and generating a manufactured vector, performing QR decomposition based on the whitening matrix and a target channel matrix, and detecting a transmission symbol vector corresponding to the reception symbol vector based on the manufactured vector and a result of the QR decomposition.

Other features and aspects will be apparent from the following detailed description, the drawings, and the claims.

Figure 1:
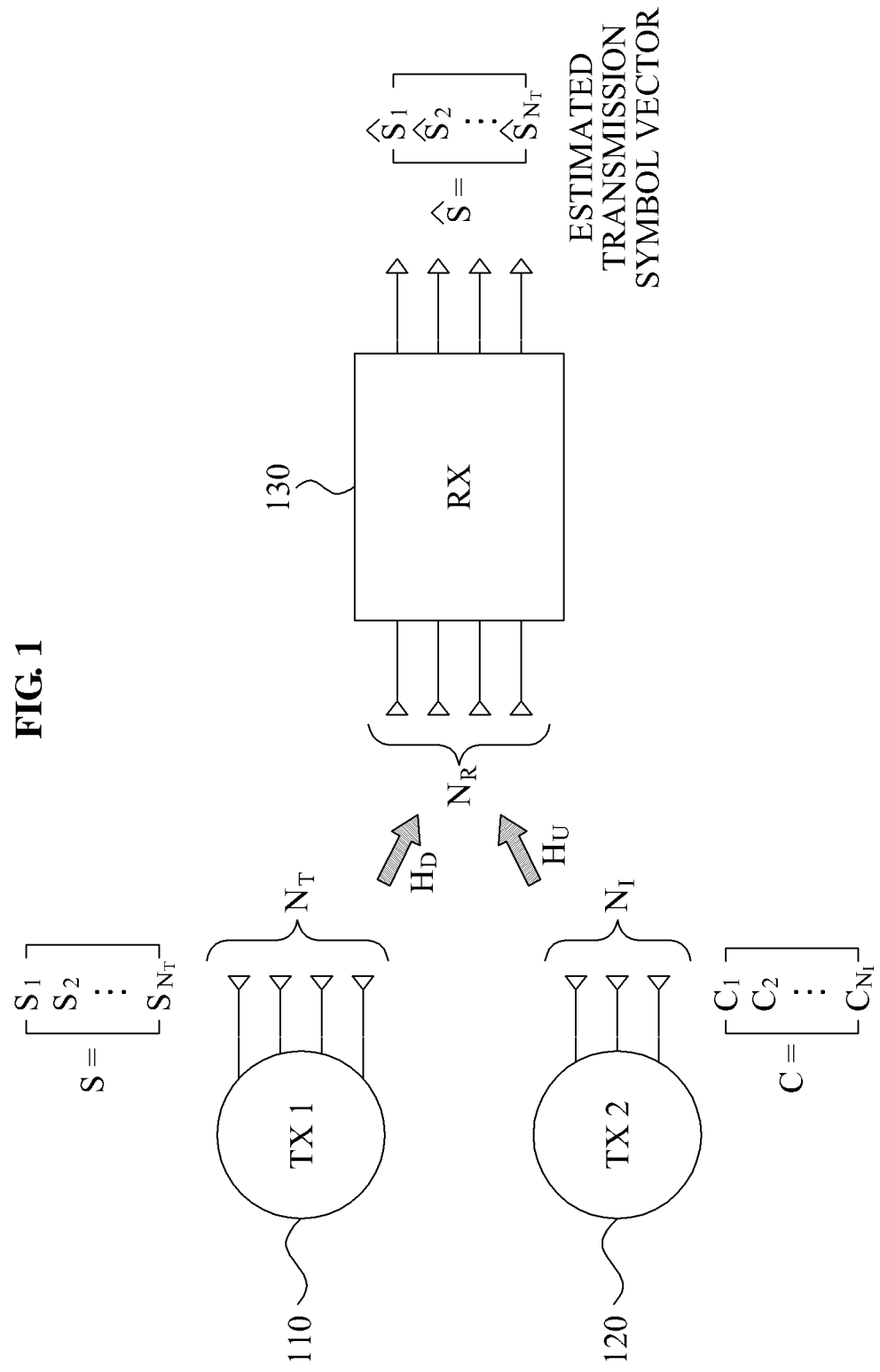
FIG. 1 is a diagram illustrating a target channel and an interference channel between at least two transmitters and receivers.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. Also, descriptions of well-known functions and constructions may be omitted for increased clarity and conciseness.

FIG. 1 illustrates a target channel and an interference channel between at least two transmitters and one or more receivers.

Referring to FIG. 1, an exemplary multi-input multi-output (MIMO) communication system includes at least two transmitters 110 and 120 and at least one receiver 130. The number of transmission antennas of the transmitter 110 (TX 1) is represented by $N_T$, the number of transmission antennas of the transmitter 120 (TX 2) is represented by $N_I$, and the number of reception antennas of the receiver 130 is represented by $N_R$. A channel matrix may form between the transmitter and the receiver. The channel matrix between the transmitter 110 (TX 1) and the receiver 130 is represented by $H_D$, and the channel matrix between the transmitter 120 (TX 2) and the receiver 130 is represented by $H_U$.

A signal transmitted from the transmitter 120 (TX 2) may become an interference to a signal transmitted from the transmitter 110 (TX 1), in the receiver 130. Hereinafter, the target channel matrix is represented by $H_D$ and the interference channel matrix is represented by $H_U$. The transmission symbol vector of the transmitter 110 (TX 1) is represented by 'S' and the transmission symbol vector of the transmitter 120 (TX 2) is represented by 'C'. Also, a dimension of the transmission symbol vector 'S' is represented by $N_T \times 1$ and a dimension of the transmission symbol vector 'C' is represented by $N_I \times 1$.

The receiver 130 receives the transmission symbol vector 'S' and the transmission symbol vector 'C' that are transmitted from the transmitter 110 (TX 1) and the transmitter 120 (TX 2), respectively. The transmission symbol illustrated by vector 'C' may act as a co-channel interference in the receiver for transmission symbol vector 'S.' Therefore, the receiver 130 may estimate the transmission symbol vector 'S' from a reception symbol vector 'x' by basing the estimate on the co-channel interference. It is desirable that the receiver 130 estimate the transmission symbol vector 'S' in as few calculations as possible.

However, it may be difficult for the receiver 130 to apply a maximum likelihood detection (MLD) scheme through QR decomposition and/or an MLD scheme through interference whitening, with a small amount of calculations. These schemes are further described below.

Figure 2:
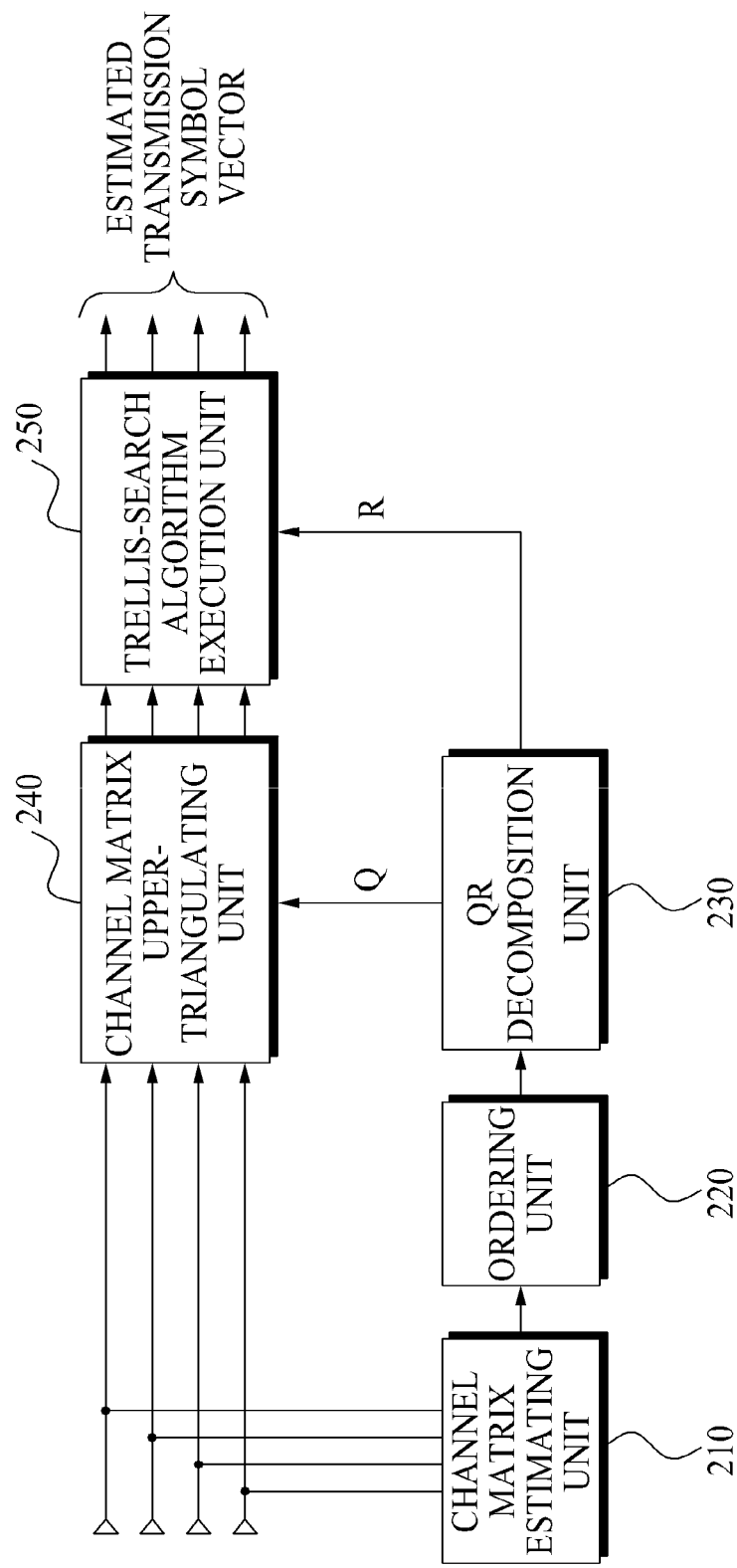
FIG. 2 is a diagram conceptually illustrating a receiver that uses a maximum likelihood detection (MLD) scheme through QR decomposition, according to a related art.

FIG. 2 illustrates a receiver that uses an MLD scheme through QR decomposition.

Referring to FIG. 2, the receiver using the MLD scheme through the QR decomposition may include a channel matrix estimating unit 210, an ordering unit 220, a QR decomposition unit 230, a channel matrix upper-triangulating unit 240, and a Trellis-search algorithm execution unit 250.

Generally, a receiver using the MLD scheme through the QR decomposition ignores an interference channel matrix. Accordingly, where a transmitter having $N_T$ transmission antennas transmits $N_T$ streams, a reception symbol vector 'x' of the receiver may be expressed as illustrated below in Equation 1.

$$x = H_D s + n \quad \text{[Equation 1]}$$

In this example, $H_D$ is a matrix between the transmitter and the receiver, and the matrix has a dimension of $N_R \times N_T$. Also, 'n' is a noise vector, and 's' is a transmission symbol vector constituted by $N_T$ streams.

The channel matrix estimating unit 210 estimates a channel matrix $H_D$. The ordering unit 220 changes an order of a plurality of column vectors included in the channel matrix $H_D$, based on a power of reception symbols. For example, the ordering unit may perform ordering of the plurality of column vectors included in the channel matrix $H_D$ according to a size of the plurality of column vectors. Hereinafter, for ease of description, it is assumed that the ordered channel matrix is identical to the original channel matrix $H_D$. However, the ordered channel matrix does not have to be identical to the original channel matrix.

The QR decomposition unit 230 performs QR decomposition with respect to the channel matrix $H_D$ as illustrated below in Equation 2.

$$H_D = QR \quad \text{[Equation 2]}$$

In this example, a Q matrix is a unitary matrix and an R matrix is an upper-triangular matrix.

The channel matrix upper-triangulating unit 240 triangulates the channel matrix $H_D$ using a Q matrix calculated by the QR decomposition unit 230, as illustrated below in Equation 3.

$$\begin{aligned} z &= Q^H x \\ &= Rs + Q^H n \end{aligned} \quad \text{[Equation 3]}$$

In this example, a manufactured reception symbol vector 'z' is defined as a multiplication of $Q^H$ and 'x.' Also, the original channel matrix $H_D$ is triangulated as $Q^H$. For example, where $N_T$ and $N_R$ are both four, the manufactured reception symbol vector 'z' may be expressed as illustrated below in Equation 4.

$$\begin{bmatrix} z_1 \\ z_2 \\ z_3 \\ z_4 \end{bmatrix} = \begin{bmatrix} r_{11} & r_{12} & r_{13} & r_{14} \\ 0 & r_{22} & r_{23} & r_{24} \\ 0 & 0 & r_{33} & r_{34} \\ 0 & 0 & 0 & r_{44} \end{bmatrix} \begin{bmatrix} s_1 \\ s_2 \\ s_3 \\ s_4 \end{bmatrix} + \begin{bmatrix} n'_1 \\ n'_2 \\ n'_3 \\ n'_4 \end{bmatrix} \quad \text{[Equation 4]}$$

The Trellis-search algorithm execution unit 250 performs a Trellis-search algorithm based on Equation 5, thereby estimating the transmission symbol vector.

$$\hat{s} = \arg\min_{\hat{s}_j \in C_j} \sum_{i=1}^{N_R} \left\| z_i - \sum_{j=i}^{N_T} r_{ij} \hat{s}_j \right\|^2 \quad \text{[Equation 5]}$$

In this example, $\hat{s}$ is the estimated transmission symbol vector, and $C_j$ is a set of constellations where a transmission symbol corresponds to $j^{th}$ stream. Also, $\hat{s}_j$ is a transmission symbol candidate.

The Trellis-search algorithm execution unit 250 may estimate elements of the transmission symbol vector sequentially from the bottom to the top of Equation 4 using a Trellis shift.

Figure 3:
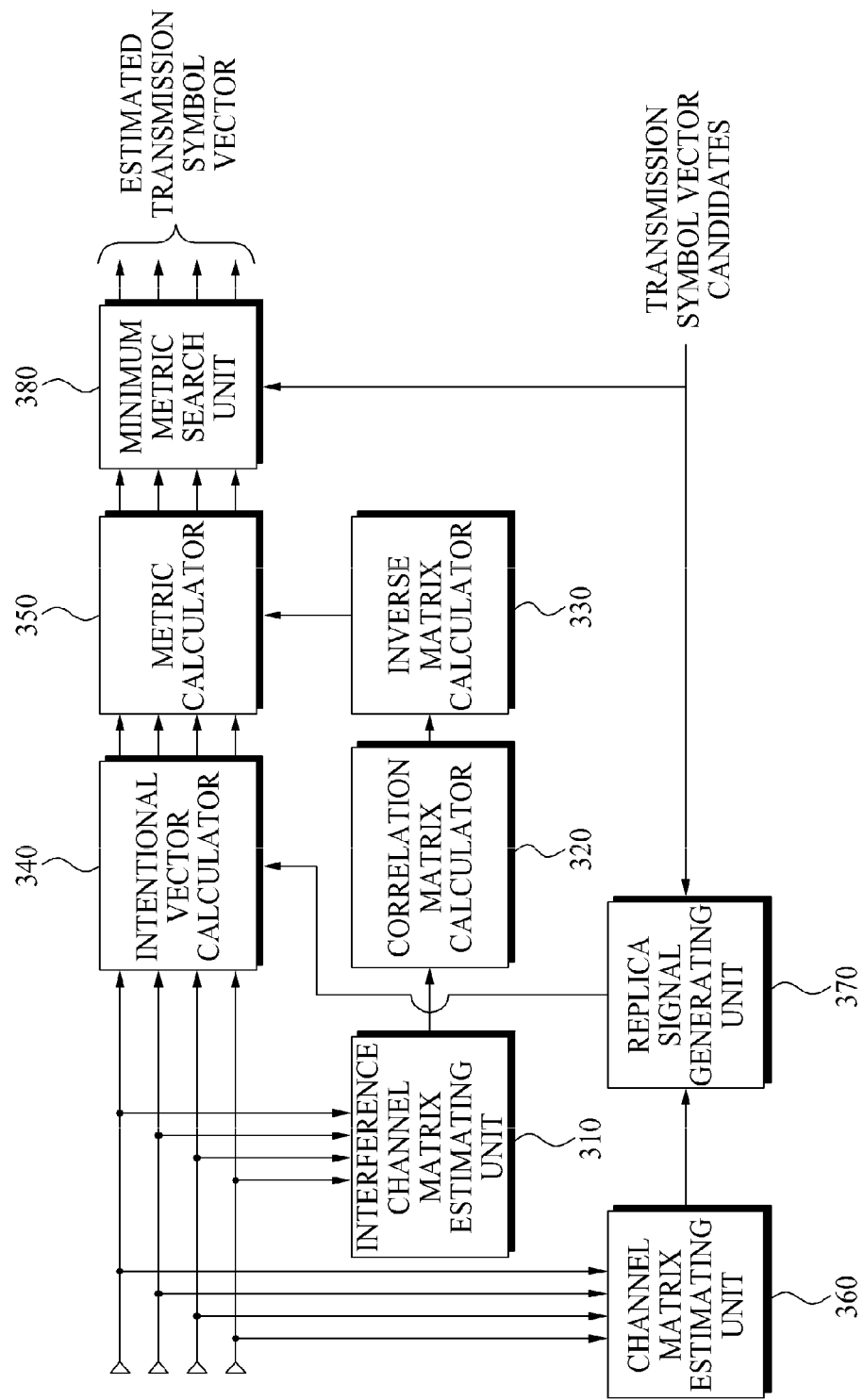
FIG. 3 is a diagram conceptually illustrating a receiver that uses an MLD scheme through interference whitening, according to a related art.

FIG. 3 illustrates a receiver that uses an MLD scheme through interference whitening.

Referring to FIG. 3, the receiver may include an interference channel matrix estimating unit 310, a correlation matrix calculator 320, an inverse matrix calculator 330, an intentional vector calculator 340, a metric calculator 350, a channel matrix estimating unit 360, a replica signal generating unit 370, and a minimum metric search unit 380.

The receiver using the MLD scheme through the interference whitening may be used in an environment where a co-channel interference exists.

With reference to FIG. 1, a reception symbol vector 'x' including the co-channel interference is illustrated below in Equation 6.

$$x = H_D s + H_U c + n \quad \text{[Equation 6]}$$

The interference matrix estimating unit 310 estimates an interference channel matrix $H_U$. In this example, the interference channel matrix $H_U$ has a dimension of $N_R \times N_I$, and a transmission symbol vector candidate is defined as $\hat{s} = [\hat{s}_1, \hat{s}_2, \ldots, \hat{s}_{N_T}]^T$. Using the transmission symbol vector candidate, an intentional vector 'e' may be expressed as illustrated below in Equation 7. The intentional vector calculator 340 may calculate the intentional vector 'e' using Equation 7 as illustrated below. In this example, $H_D \hat{s}$ is provided to the intentional vector calculator 340 by the replica signal generating unit 370.

$$e = x - H_D \hat{s} \quad \text{[Equation 7]}$$
$$= H_D(s - \hat{s}) + H_U c + n$$

Where the transmission vector candidate is equal to an actual transmission symbol vector, for example, where $\hat{s} = s$, a correlation matrix $R_{ee}$ of the intentional vector may be expressed as illustrated below in Equation 8.

$$R_{ee} = E[ee^H] \quad \text{[Equation 8]}$$
$$= \frac{1}{N_T} H_U H_U^H + \sigma^2 I_{N_R}$$

In this example, $I_{N_R}$ is a unit matrix having a dimension of $N_R \times N_R$. The correlation matrix calculator 320 calculates the correlation vector $R_{ee}$ of the intentional vector 'e,' using Equation 8 as illustrated above. The inverse calculator 330 calculates an inverse matrix $R_{ee}^{-1}$ of the correlation matrix $R_{ee}$.

The metric calculator 350 calculates a metric for performing the MLD scheme based on the intentional vector 'e' and the inverse matrix $R_{ee}^{-1}$ of the correlation matrix $R_{ee}$. The metric may be calculated as illustrated below in Equation 9.

$$\text{metric} = e^H R_{ee}^{-1} e \quad \text{[Equation 9]}$$

The metric calculator 350 may calculate the metric of Equation 9 with respect to transmission symbol vector candidates.

The minimum metric search unit 380 selects a minimum transmission symbol vector candidate of the metric of Equation 9, and estimates the selected transmission symbol vector candidate as the actual transmission symbol vector. For example, the minimum metric search unit 380 may use Equation 10 as illustrated below to estimate the actual transmission symbol vector.

$$\hat{s} = \arg\min_{\hat{s} \in S} e^H R_{ee}^{-1} e \quad \text{[Equation 10]}$$

In this example, 'S' is a set of the transmission symbol vector candidates.

For reference, the metric of Equation 9 may be expanded as illustrated below in Equation 11.

$$e^H R_{ee}^{-1} e = (H_U c + n)^H R_{ee}^{-1} (H_U c + n) \quad \text{[Equation 11]}$$
$$= c^H H_U^H R_{ee}^{-1} H_U c + c^H H_U^H R_{ee}^{-1} n + $$
$$n^H R_{ee}^{-1} H_U c + n^H R_{ee}^{-1} n.$$

A first term of Equation 11 is canceled due to $R_{ee}^{-1}$, and a second term and a third term include an interference component. Also, as interference decreases, for example, as a signal-to-noise ratio (SNR) increases, the second term and the third term decrease.

The MLD scheme through the QR decomposition and the MLD scheme through the interference whitening have been described with reference to FIGS. 2 and 3. Because the receiver using the MLD scheme through the QR decomposition ignores the co-channel interference, it may be difficult to have high performance in a situation where the co-channel interference cannot be ignored. Also, as a number of streams increases, the amount of calculation increases in the receiver using the MLD scheme through interference whitening. In addition, the receiver using the MLD scheme through the interference whitening requires the intentional vector to calculate the metric. Also, because elements constituting the intentional vector are sequentially determined as a Trellis shift proceeds, it may be difficult to apply Equation 8 directly to the MLD scheme through the QR decomposition. Thus, it may be difficult to perform both interference whitening and QR decomposition using the receivers illustrated in FIGS. 2 and 3.

Figure 4:
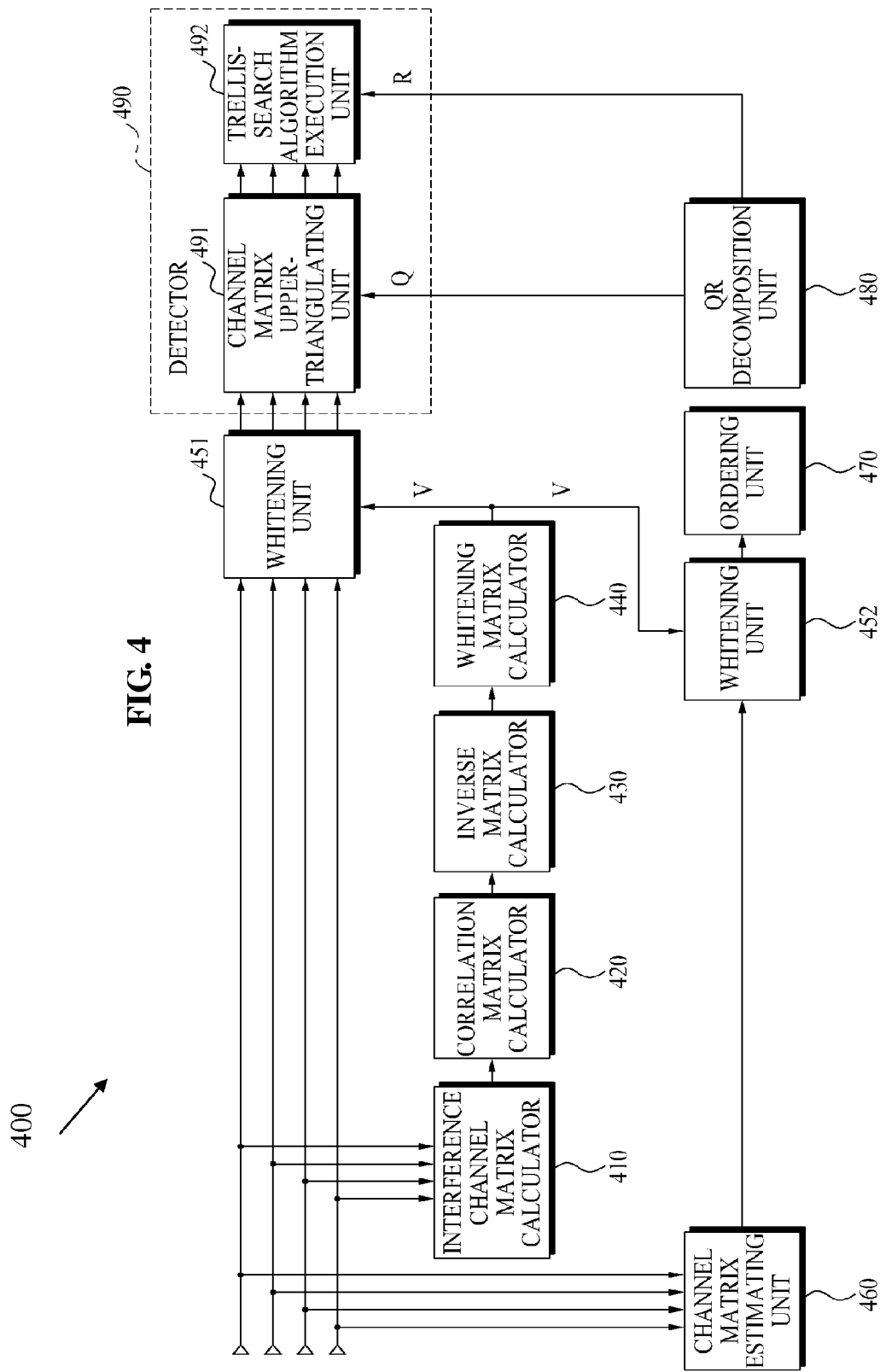
FIG. 4 is a diagram illustrating an exemplary QR decomposition detection device that supports interference whitening.

FIG. 4 illustrates an exemplary QR decomposition detection device that supports interference whitening.

Prior to describing exemplary embodiments with reference to FIG. 4, a description of the QR decomposition detection device 400 that supports interference whitening that may perform both interference whitening and QR decomposition is given. The QR decomposition detection device 400 may perform both interference whitening and the QR decomposition with a smaller amount of calculations. The QR decomposition detection device 400 considers a transmission symbol vector by considering a co-channel interference.

Referring to FIG. 4, the QR decomposition detection device 400 that supports interference whitening may include an interference channel matrix calculator 410, a correlation matrix calculator 420, an inverse matrix calculator 430, a whitening matrix calculator 440, whitening units 451 and 452, a channel matrix estimating unit 460, an ordering unit 470, a QR decomposition unit 480, and a detector 490.

The interference channel matrix calculator 410 calculates an interference channel matrix H. The correlation matrix calculator 420 calculates a correlation matrix $R_{ee}$ of an intentional vector 'e' based on the interference channel matrix $H_U$ calculated using Equation 8. The inverse matrix calculator 430 calculates an inverse matrix $R_{ee}^{-1}$ of the correlation matrix $R_{ee}$ of the intentional vector 'e.' The whitening matrix calculator 440 calculates a whitening matrix 'V' for whitening an interference existing in a reception symbol vector based on the inverse matrix $R_{ee}^{-1}$ of the correlation matrix $R_{ee}$.

A procedure of calculating the whitening matrix 'V' is described below. The metric of Equation 9 may be expanded as illustrated below in Equation 12.

$$e^H R_{ee}^{-1} e = e^H V^H V e \qquad \text{[Equation 12]}$$
$$= (Ve)^H Ve$$

According to an exemplary embodiment, the QR decomposition detection device 400 that supports interference whitening uses matrix 'V' of Equation 12 as the whitening matrix, and whitens the interference existing in the reception symbol vector. The QR decomposition detection device 400 that supports interference whitening may perform the MLD scheme through the QR decomposition after whitening the interference existing in the reception symbol vector.

Where an eigen-value decomposition is applied to the inverse matrix $R_{ee}^{-1}$, it may be expressed as $R_{ee}^{-1}=UDU^H$. In this example, 'U' is an orthogonal matrix and 'D' is a diagonal matrix. When $V=D^{1/2}U^H$, $R_{ee}^{-1}$ may be decomposed into $V^H V$, and a large amount of calculation may be performed during the decomposition.

According to an exemplary embodiment, the whitening matrix calculator 440 performs a Cholesky decomposition algorithm, thereby decomposing $R_{ee}^{-1}$ into $AA^H$ with a smaller amount of calculations. In this example, A is a lower triangular matrix, and the whitening matrix calculator 440 determines that $V=A^H$, thereby simply calculating the whitening matrix V.

An exemplary Cholesky decomposition algorithm may be expressed as illustrated below using pseudo code.

—Cholesky Decomposition Algorithm—

```
for j = 1 : N_R
    for i = j : N_R
        t(i) = R_ee^-1(i,j)
        for k = 1 : j - 1
            t(i) = t(i) - A*(j,k)A(i,k)
        end
        A(i,j) = t(i)/√t(j)
    end
end
```

Once calculated, the whitening matrix 'V' may be provided to the whitening units 451 and 452.

For example, the whitening unit 451 may generate a manufactured vector Vx by multiplying the reception symbol vector 'x' by the whitening matrix 'V,' and the whitening unit 452 may multiply a target channel matrix $H_D$ by 'V.' In this example, multiplication of the reception symbol vector 'x' by 'V' indicates that an error existing in the reception signal is whitened. Hereinafter, Vx is referred to as a manufactured vector.

The intentional vector 'e' may be transformed using the whitening matrix 'V,' and the transformed intentional vector $\tilde{e}$ may be expressed as illustrated below in Equation 13.

$$\tilde{e} = Ve \qquad \text{[Equation 13]}$$
$$= Vx - VH_D \hat{s}$$

$VH_D$, which is the multiplication of target channel matrix $H_D$ and the whitening matrix 'V,' may be expressed as illustrated below in Equation 14. For example, the transformed target channel matrix $VH_D$ having the whitening interference may be decomposed into a 'Q' matrix and an 'R' matrix as illustrated below in Equation 14.

$$VH_D = QR \qquad \text{[Equation 14]}$$

In the example equation, the Q matrix is a unitary matrix and the R matrix is an upper-triangular matrix.

The ordering unit 470 performs ordering of column vectors included in the $VH_D$. For the ease of description, it is assumed that the column vectors included in the $VH_D$ are already ordered.

As written in Equation 14, the QR decomposition unit 480 decomposes the transformed target channel matrix $VH_D$ having the whitening interference into the Q matrix and the R matrix. In this example, the Q matrix and the R matrix are provided to the detector 490. For example, the Q matrix may be provided to the channel matrix upper-triangulating unit 491 of the detector 490, and the R matrix may be provided to the Trellis search algorithm execution unit 492.

The detector 490 detects/estimates a transmission symbol vector corresponding to the reception symbol vector 'x' based on the manufactured vector Vx and an output of the QR decomposition unit 480.

The channel matrix upper-triangulating unit 491 of the detector 490 may upper-triangulate the target channel matrix $H_D$ using the manufactured vector Vx and the Q matrix generated by the QR decomposition. For example, the channel matrix upper-triangulating unit 491 may multiply the manufactured vector Vx by a Hermitian matrix of the Q matrix as illustrated below in Equation 15 below.

$$z = Q^H Vx \qquad \text{[Equation 15]}$$

In this example, 'z' may be expressed differently as illustrated below in Equation 16.

$$z = Q^H V x \quad \text{[Equation 16]}$$
$$= Q^H V(H_D s + H_U c + n)$$
$$= Rs + Q^H V H_U c + Q^H V n$$

Referring to Equation 16, the target channel matrix $H_D$ is transformed to an upper-triangular matrix R. In this example, with respect to the vector 'z,' the MLD scheme or the Trellis-search algorithm may be applied with only a smaller amount of calculations.

The Trellis-search algorithm execution unit 492 of the detector 490 may estimate the transmission symbol vector based on the output of the channel matrix upper-triangulating unit 491. The Trellis-search algorithm execution unit 492 is an example of an estimating unit (not illustrated). For example, the Trellis-search algorithm execution unit 492 may apply the Trellis search algorithm to Equation 17 illustrated below, to estimate the transmission symbol vector.

$$\hat{s} = \arg\min_{\hat{s}_j \in C_j} \sum_{i=1}^{N_R} \left\| z_i - \sum_{j=i}^{N_T} r_{ij}\hat{s}_j \right\|^2 \quad \text{[Equation 17]}$$

According to an exemplary embodiment, the QR decomposition detection device 400 simultaneously performs interference whitening and QR decomposition, manufactures the reception symbol vector 'x' to enable detection of the transmission symbol vector even with the smaller amount of calculations, and generates the whitening matrix V. The target channel matrix $H_D$ is transformed to the upper-triangular matrix R, thereby enabling the Trellis-search algorithm to be easily applied.

Figure 5:
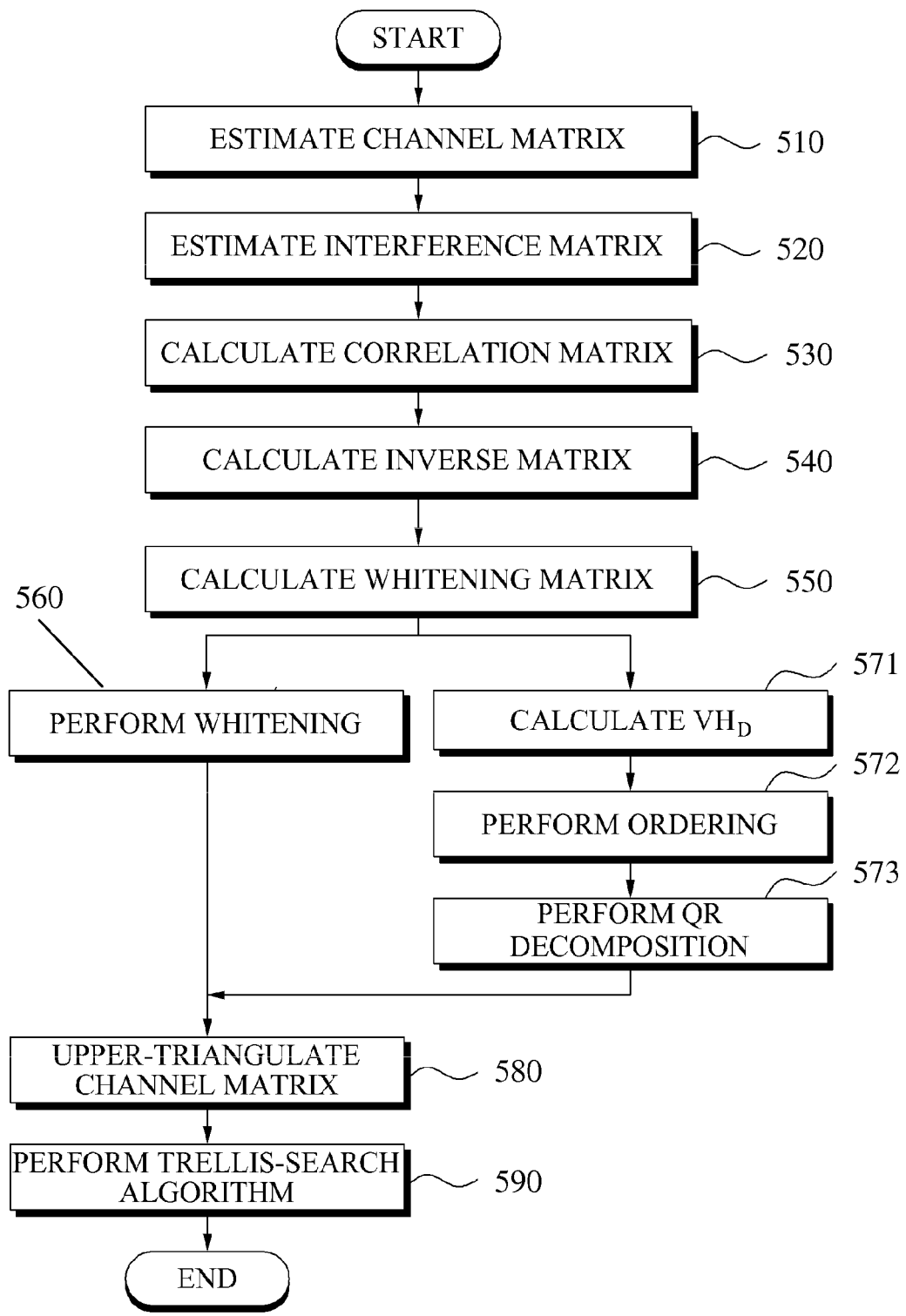
FIG. 5 is a flowchart illustrating an exemplary QR decomposition detection method that supports interference whitening.

FIG. 5 shows a flowchart illustrating an exemplary QR decomposition detection method that supports interference whitening.

Referring to FIG. 5, the QR decomposition detection method supporting the interference whitening estimates a channel matrix in 510. In this example, the channel matrix is a target channel matrix that has been described.

The QR decomposition detection method supporting the interference whitening estimates an interference matrix in 520.

The QR decomposition detection method supporting the interference whitening calculates a correlation matrix of an intentional vector related to an error existing in a reception symbol vector based on the interference channel matrix in 530.

The QR decomposition detection method supporting the interference whitening calculates an inverse matrix of the correlation matrix in 540.

The QR decomposition detection method supporting the interference whitening calculates a whitening matrix based on the inverse matrix of the correlation matrix in 550.

The QR decomposition detection method supporting the interference whitening performs whitening of an interference existing in the reception symbol vector using the whitening matrix to generate a manufactured vector in 560.

The QR decomposition detection method supporting the interference whitening multiplies the whitening matrix and the target channel matrix in 571.

The QR decomposition detection method supporting the interference whitening performs ordering of the multiplication of the whitening matrix and the target channel matrix in 572. Hereinafter, it is assumed that the multiplication of the whitening matrix and the target channel matrix is already ordered.

The QR decomposition detection method supporting the interference whitening performs QR decomposition with respect the multiplication of the whitening matrix and the target channel matrix in 573. For example, a Q matrix and an R matrix may be generated by performing of the QR decomposition with respect to the multiplication of the whitening matrix and the target channel matrix in 573. To reduce the amount of calculations, a Cholesky decomposition algorithm may be used.

The QR decomposition detection method supporting the interference whitening upper-triangulates the target channel matrix using the manufactured vector and the Q matrix generated by the QR decomposition in 580.

The QR decomposition detection method supporting the interference whitening performs the Trellis-search algorithm to estimate the transmission symbol vector based on a result of the upper-triangulating in 590.

The methods according to the above-described example embodiments may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. In addition, a computer-readable storage medium may be distributed among computer systems connected through a network and computer-readable codes or program instructions may be stored and executed in a decentralized manner.

According to exemplary embodiments, a QR decomposition detection device and method supporting the interference whitening may simultaneously perform interference whitening and QR decomposition. Accordingly, deterioration of performance due to a co-channel interference may be prevented. A transmission symbol vector may be estimated based upon the co-channel interference.

According to exemplary embodiments, a QR decomposition detection device and method supporting the interference whitening may simultaneously perform interference whitening and QR decomposition, and reduce the amount of calculations needed to do so.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A QR decomposition detection device supporting interference whitening, the device comprising:
    a whitening unit to perform whitening of interference existing in a reception symbol vector using a whitening matrix calculated based on an interference channel matrix, and to generate a manufactured vector;
    a QR decomposition unit to perform QR decomposition based on the whitening matrix and a target channel matrix, which is distinguished from the interference channel matrix; and
    a detector to detect a transmission symbol vector corresponding to the reception symbol vector based on the manufactured vector and a result of the QR decomposition.

2. The device of claim 1, further comprising:
    an interference channel matrix estimating unit to estimate the interference channel matrix;
    a correlation matrix calculator to calculate a correlation matrix of an intentional vector related to an error existing in the reception symbol vector, based on the interference channel matrix; and
    a whitening matrix calculator to calculate the whitening matrix based on the correlation matrix.

3. The device of claim 2, wherein the whitening matrix calculator performs a Cholesky decomposition of an inverse matrix of the correlation matrix, to calculate the whitening matrix.

4. The device of claim 2, wherein the whitening matrix calculator determines an upper-triangular matrix as the whitening matrix, wherein the upper-triangular matrix is obtained by performing a Cholesky decomposition with respect to an inverse matrix of the correlation matrix.

5. The device of claim 2, further comprising:
    an inverse matrix calculator to calculate an inverse matrix of the correlation matrix, wherein
    the whitening matrix calculator calculates the whitening matrix based on the inverse of the correlation matrix.

6. The device of claim 1, wherein a multiplication of the whitening matrix and the target channel matrix includes a plurality of columns, and the QR decomposition unit performs ordering of the plurality of columns according to a size of the plurality of columns and performs the QR decomposition with respect to the multiplication of the whitening matrix and the target channel matrix.

7. The device of claim 1, wherein the whitening unit multiplies the reception symbol vector by the whitening matrix to generate the manufactured vector.

8. The device of claim 1, wherein the QR decomposition unit performs the QR decomposition with respect to a multiplication of the whitening matrix and the target channel matrix, and generates a Q matrix and an R matrix.

9. The device of claim 1, wherein the detector comprises:
    a channel matrix upper-triangulating unit to upper-triangulate the target channel matrix using the manufactured vector and a Q matrix generated by the QR decomposition; and
    an estimating unit to estimate the transmission symbol vector based on an output of the channel matrix upper-triangulating unit.

10. The device of claim 9, wherein the estimating unit supports interference whitening and estimates the transmission symbol vector according to a Trellis-search algorithm.

11. The device of claim 9, wherein the channel matrix upper-triangulating unit multiplies the manufactured vector by a Hermitian matrix of the Q matrix.

12. A QR decomposition method supporting interference whitening in a receiver, the method comprising:
    estimating an interference channel matrix;
    calculating, based on the estimated interference channel matrix, a correlation matrix of an intentional vector related to an error existing in a reception symbol vector;
    whitening interference existing in the reception symbol vector using the whitening matrix, and generating a manufactured vector;
    performing QR decomposition based on the whitening matrix and a target channel matrix, which is distinguished from the interference channel matrix; and
    detecting a transmission symbol vector corresponding to the reception symbol vector based on the manufactured vector and a result of the QR decomposition.

13. The method of claim 12, wherein the calculating of the whitening matrix includes performing a Cholesky decomposition with respect to an inverse matrix of the correlation matrix, to calculate the whitening matrix.

14. The method of claim 12, wherein the detecting of the transmission symbol vector comprises:
    upper-triangulating the target channel matrix using the manufactured vector and a Q matrix generated by the QR decomposition; and
    estimating the transmission symbol vector using a result obtained from the upper-triangulating of the channel matrix.

15. A non-transitory computer readable recording media storing a program for implementing a method comprising:
    estimating an interference channel matrix;
    calculating, based on the estimated interference channel matrix, a correlation matrix of an intentional vector related to an error existing in a reception symbol vector;
    whitening interference existing in the reception symbol vector using the whitening matrix, and generating a manufactured vector;
    performing QR decomposition based on the whitening matrix and a target channel matrix, which is distinguished from the interference channel matrix; and
    detecting a transmission symbol vector corresponding to the reception symbol vector based on the manufactured vector and a result of the QR decomposition.

* * * * *